(12) United States Patent
Pasadilla et al.

(10) Patent No.: US 10,493,404 B2
(45) Date of Patent: Dec. 3, 2019

(54) HEAT AND HUMIDITY REMOVAL UNIT FOR A SELF-CONTAINED BREATHING APPARATUS

(71) Applicant: Paragon Space Development Corporation, Tucson, AZ (US)

(72) Inventors: Patrick Dee Pasadilla, Tucson, AZ (US); Chad E. Bower, Littleton, CO (US); Laura Katrina Kelsey, Tucson, AZ (US)

(73) Assignee: Paragon Space Development Corporation, Tucson, AZ (US)

( * ) Notice: Subject to any disclaimer, the term of this patent is extended or adjusted under 35 U.S.C. 154(b) by 418 days.

(21) Appl. No.: 15/360,750

(22) Filed: Nov. 23, 2016

(65) Prior Publication Data

US 2017/0143933 A1 May 25, 2017

Related U.S. Application Data

(60) Provisional application No. 62/259,439, filed on Nov. 24, 2015.

(51) Int. Cl.
*B01D 53/62* (2006.01)
*A62B 9/00* (2006.01)
*B63C 11/00* (2006.01)
*A62B 7/10* (2006.01)

(52) U.S. Cl.
CPC .............. *B01D 53/62* (2013.01); *A62B 9/003* (2013.01); *B63C 11/00* (2013.01); *A62B 7/10* (2013.01)

(58) Field of Classification Search
CPC .................. A61M 16/00; A61M 16/12; A61M 2205/3606; A61M 16/10; A61M 16/105; A61M 16/009; A61M 16/22; B01D 53/62; A62B 9/00; A62B 9/003; A62B 7/00; A62B 7/10; B63C 11/00
USPC ................................. 604/204.15; 128/204.15
See application file for complete search history.

(56) References Cited

U.S. PATENT DOCUMENTS

| 5,218,833 | A |   | 6/1993  | Newbold |                    |
|-----------|---|---|---------|---------|--------------------|
| 5,222,479 | A | * | 6/1993  | Brauer  | ...... A62B 7/08   |
|           |   |   |         |         | 128/202.26         |
| 5,996,976 | A | * | 12/1999 | Murphy  | ...... B01D 53/22  |
|           |   |   |         |         | 261/104            |

(Continued)

*Primary Examiner* — Jason E Flick
(74) *Attorney, Agent, or Firm* — Weaver Austin Villeneuve & Sampson LLP

(57) ABSTRACT

This disclosure relates to a regenerable, heat-abating, humidity-neutralizing, carbon dioxide removal system for a self-contained breathing apparatus. The self-contained breathing apparatus can include a carbon dioxide removal unit that scrubs carbon dioxide out of exhaled air from a user to provide humidified, scrubbed exhaled air. The self-contained breathing apparatus can further include a heat and humidity removal unit that is configured to receive the humidified, scrubbed exhaled air, and is configured to remove water vapor and heat associated with the water vapor from the humidified, scrubbed exhaled air in order to provide cooled, dehumidified inhalation air. The cooled, dehumidified air can be supplemented with oxygen and returned to the user at a comfortable temperature. In some implementations, the heat and humidity removal unit can replace conventional heat exchange and energy storage units, including heat exchange and energy storage units that use phase change materials.

20 Claims, 11 Drawing Sheets

(56) References Cited

U.S. PATENT DOCUMENTS

| | | |
|---|---|---|
| 6,330,883 B1 | 12/2001 | Berger |
| 6,610,122 B1 | 8/2003 | Filburn et al. |
| 8,764,888 B2 | 7/2014 | Ophir et al. |
| 2014/0041662 A1* | 2/2014 | Almqvist .......... A61M 16/0045 128/204.23 |
| 2014/0065054 A1* | 3/2014 | Noyes .................... A62B 13/00 423/438 |
| 2016/0213879 A1* | 7/2016 | Parthasarathy ..... A61M 16/208 |

* cited by examiner

HEAT AND HUMIDITY REMOVAL UNIT FOR A SELF-CONTAINED BREATHING APPARATUS

PRIORITY CLAIM

This application claims priority to U.S. Provisional Patent Application No. 62/259,439 filed Nov. 24, 2015 and entitled "HEAT AND HUMIDITY REMOVAL UNIT FOR A SELF-CONTAINED BREATHING APPARATUS," which is hereby incorporated by reference in its entirety and for all purposes.

STATEMENT REGARDING FEDERALLY SPONSORED RESEARCH OR DEVELOPMENT

Some embodiments of this invention were made with United States Government Support under Contract No. W911SR-14-C-0014 awarded by the United States Army. The U.S. Government has certain rights in this invention.

TECHNICAL FIELD

This disclosure relates to heat and humidity removal within a breathing loop, and more particularly to heat and humidity removal via transfer to an external environment in a regenerable, heat-abating, humidity-neutralizing, carbon dioxide removal system for a self-contained breathing apparatus.

BACKGROUND

Self-contained breathing apparatuses (SCBAs) can be very useful in providing breathable air to users, such as astronauts, firefighters, rescue workers, etc., in hostile environments for breathing. SCBAs can also be very useful in providing breathable air in extraterrestrial environments, including the moon, Mars, asteroids, and other environments in space. Return of conditioned breathable air may be critical in potential Immediately Dangerous to Life and Health (IDLH) or Biological, Radiological, and Nuclear (CBRN) environments. Closed-loop SCBAs may remove carbon dioxide from exhaled breath, and recirculate the exhaled breath back to the user by supplementing the exhaled breath with oxygen. Closed-loop SCBAs may provide a long-duration supply of conditioned breathing gas to the user.

State of the art closed-loop SCBAs typically rely on a chemical sorbent to remove carbon dioxide from exhaled breath, performing a function in reconditioning the flow for inhalation. The chemical sorbent may release water and heat as a byproduct of the chemical reaction with carbon dioxide. Heat and water generated by carbon dioxide sorbents found in SCBA systems, including in off-the-shelf SCBA systems, can result in dangerously high return temperatures and undesirable condensation in the SCBA systems. Increased heat and humidity in recirculated air may also adversely affect user comfort during breathing. Closed-loop SCBAs may integrate heavy ice or other phase change materials to provide sensible cooling. However, these cooling systems are not only heavy but their effectiveness can be short-lived and severely limit the use duration in warm to hot environments. These cooling systems are heavy, logistics-intensive, and quickly expended depending on the environment that the SCBA is operated in. Conventional exchange and energy storage units may not be applicable with high-performance chemical sorbents, such as soda lime and lithium hydroxide, which react to form water. The water may condense and limit the ability of such conventional exchange and energy storage units from performing bulk heat exchange.

SUMMARY

The systems, methods and devices of this disclosure each have several innovative aspects, no single one of which is solely responsible for the desirable attributes disclosed herein.

One innovative aspect of the subject matter described in this disclosure can be implemented in a self-contained breathing apparatus. The self-contained breathing apparatus can include a carbon dioxide removal unit for receiving breathing air exhaled from a user, the carbon dioxide removal unit being configured to remove carbon dioxide from the breathing air and add heat and moisture to the breathing air upon removal of the carbon dioxide. The self-contained breathing apparatus further includes a differential volume downstream from the carbon dioxide removal unit, where the differential volume is configured to accommodate a change in volume during exhalation or inhalation by the user, and where the differential volume is configured to receive the breathing air from the carbon dioxide removal unit. The self-contained breathing apparatus further includes a heat and mass exchanger downstream from the differential volume, where the heat and mass exchanger is configured to receive the breathing air from the differential volume, and where the heat and mass exchanger is configured to remove at least some of the heat and the moisture in the breathing air to provide cooler and less humidified air back to the user.

In some implementations, the apparatus further includes an oxygen source, where the oxygen source is configured to provide oxygen to the breathing air to the cooler and less humidified air back to the user. In some implementations, the heat and mass exchanger includes an ionomer or ionic fluid impregnated membrane, where the heat and mass exchanger is configured to receive a purge gas stream to flow across the ionomer or ionic fluid impregnated membrane. In some implementations, the ionomer membrane includes a plurality of Nafion® tubes. In some implementations, the heat and mass exchanger is configured to prevent condensation in the self-contained breathing apparatus. In some implementations, the purge gas stream is ambient air from an environment outside of the self-contained breathing apparatus. In some implementations, the apparatus further includes a housing enclosing the differential volume, where the housing includes an enclosed volume providing a flow path for the at least some of the heat and the moisture from the heat and mass exchanger to be removed from the self-contained breathing apparatus. The housing can include an inlet for receiving the purge gas stream with the at least some of the heat and the moisture from the heat and mass exchanger, and an outlet for removing the purge gas stream with the at least some of the heat and the moisture to the environment outside of the self-contained breathing apparatus. The purge gas stream can be removed through the outlet of the housing when the enclosed volume is displaced by expansion of the differential volume.

Another innovative aspect of the subject matter described in this disclosure can be implemented in a method of manufacturing a self-contained breathing apparatus. The method includes providing a self-contained breathing unit, where the self-contained breathing unit includes a carbon dioxide removal unit for receiving breathing air exhaled from a user, the carbon dioxide removal unit is configured to remove carbon dioxide from the breathing air and add heat and moisture to the breathing air upon removal of the carbon dioxide. The self-contained breathing unit further includes a differential volume downstream from the carbon dioxide removal unit, where the differential volume is configured to accommodate a change in volume during inhalation and exhalation by the user, and the differential volume is configured to receive the breathing air from the carbon dioxide removal unit. The self-contained breathing unit further includes a heat exchange and energy storage unit downstream from the differential volume, where the heat exchange and energy storage unit is configured to receive the breathing air from the differential volume, and the heat exchange and energy storage unit is configured to remove at least some of the heat in the breathing air to provide cooler air back to the user. The method further includes replacing the heat exchange and energy storage unit with a heat and mass exchanger in the self-contained breathing apparatus, where the heat and mass exchanger is configured to receive the breathing air from the differential volume, and where the heat and mass exchanger is configured to remove at least some of the heat and the moisture in the breathing air to provide cooler and less humidified air back to the user. The method further includes modifying the self-contained breathing unit to enclose the differential volume in a housing, where the housing includes an enclosed volume providing a flow path for the at least some of the heat and the moisture from the heat and mass exchanger to be removed from the self-contained breathing unit.

In some implementations, the self-contained breathing unit further includes an oxygen source, wherein the oxygen source is configured to provide oxygen to the breathing air to the cooler and less humidified air back to the user. In some implementations, the heat and mass exchanger includes an ionomer or ionic fluid impregnated membrane, where the heat and mass exchanger is configured to receive a purge gas stream to flow across the ionomer or ionic fluid impregnated membrane. In some implementations, the ionomer membrane includes a plurality of Nafion® tubes. In some implementations, the heat and mass exchanger is configured to prevent condensation in the self-contained breathing apparatus. In some implementations, the housing includes an inlet for receiving the purge gas stream with the at least some of the heat and the moisture from the heat and mass exchanger, and an outlet for removing the purge gas stream with the at least some of the heat and the moisture to the environment outside of the self-contained breathing unit, where the purge gas stream is removed through the outlet of the housing when the enclosed volume is displaced by expansion of the differential volume.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
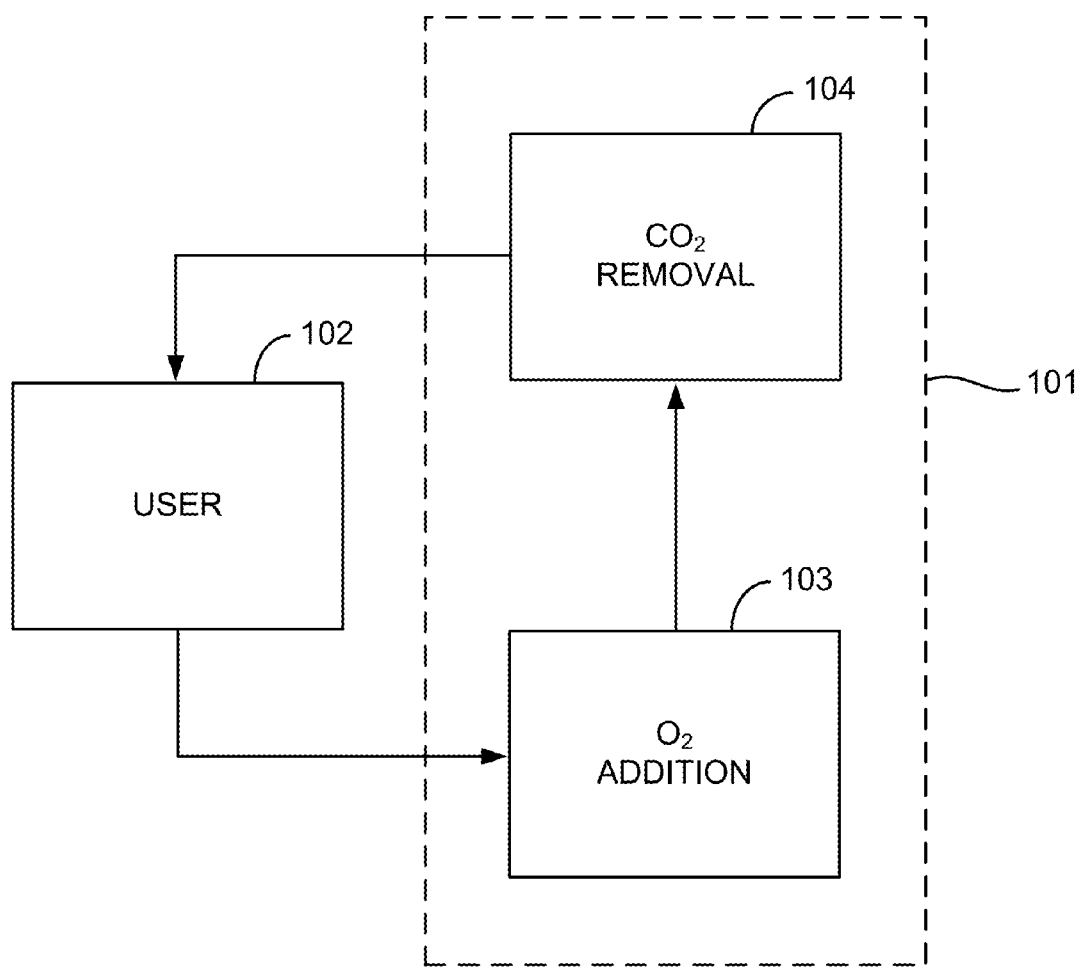
FIG. 1A shows a flow diagram illustrating an example SCBA including an oxygen source and a carbon dioxide removal unit.

The present disclosure relates to a closed-loop self-contained breathing apparatus (SCBA) that includes a heat and humidity removal unit that serves as a combined heat and mass exchanger, which rejects both the heat and water generated by a chemical sorbent to the local environment. The efficiency of the heat exchange and the mass exchange enables the inhaled breath to be conditioned to a temperature and humidity nearly equal to the surrounding conditions. In some implementations, the heat and humidity removal unit can include an ionomer or ionic fluid impregnated membrane to act as a heat and mass exchanger. For example, the ionomer or ionic fluid impregnated membrane can include Nafion® or other ionic fluid with similar functionality.

Particular implementations of the subject matter described in the present disclosure can be implemented to realize one or more of the following potential advantages. The heat and humidity removal unit of the present disclosure may replace expendable cooling systems (e.g., phase change materials or ice packs) previously integrated in SCBAs, thereby eliminating the need to prepare, install, and keep expendables operationally ready. This reduces a logistics burden. The heat and humidity removal unit of the present disclosure can be packaged to fit within a similar volume as the expendable cooling system that it replaces. The heat and humidity removal unit may be lighter in terms of weight than typical expendable cooling systems. Not only can a logistics burden be mitigated or eliminated, the heat and humidity removal unit is capable of returning breathing air at essentially a similar temperature and humidity as a surrounding environment. As a result, the SCBA of the present disclosure can be used in any combination of temperature and humidity environments deemed suitable for normal operations. Moreover, the user can breathe conditioned air that is not dangerous or uncomfortable in terms of temperature and humidity. Return of conditioned breathing air at conditions so close to ambient is advancement in SCBA technology as it allows comfortable use in any temperature and humidity environment that would otherwise be a suitable working environment. Not only does the heat and humidity removal unit accommodate sensible cooling of air but also limits the latent heat of condensation so that little to no condensation is generated in the SCBA. The heat and humidity removal unit of the present disclosure can utilize a membrane heat and mass exchange system to reduce system weight, reduce operational logistics, reduce heat transfer burden, increase user comfort, prolong entry, and expand the duration of operational use compared to conventional SCBA systems.

Direct rejection of the water vapor without condensation both increases the net heat transfer efficiency of the heat and humidity removal unit over a traditional heat exchanger, and provides much drier air to the user. Through evaporation in the lungs, this drier air feels sensibly cooler than saturated air.

The heat and humidity removal unit of the present disclosure can provide an advantage over expendable ice packs because the expendable ice packs may stop providing cooling once the ice is melted, which can be around tens or hundreds of minutes during nominal breathing, whereas the heat and humidity removal unit of the present disclosure can function indefinitely. Thus, the duration of operational use in the SCBA is not limited by the heat and humidity removal unit, but may only be limited by the capacity of the carbon dioxide removal unit and/or the oxygen source.

SCBAs serve two basic functions as illustrated in FIG. 1A: (1) remove carbon dioxide from the user's respiration, and (2) replace the oxygen consumed by the user's respiration. FIG. 1A shows a flow diagram illustrating an example SCBA including an oxygen source and a carbon dioxide removal unit. An SCBA 101 can include an oxygen source 103 and a carbon dioxide removal unit 104. A user 102 may interact with the SCBA 101 by exhaling air that is replenished with oxygen ($O_2$) by the oxygen source 103, and removed of carbon dioxide ($CO_2$) by the carbon dioxide removal unit 104. In some implementations, the carbon dioxide removal unit 104 is a chemical sorbent or other $CO_2$ scrubber. While the flow diagram in FIG. 1A shows separate sources for $CO_2$ removal and $O_2$ addition, it is possible for the SCBA 101 to have the oxygen cogenerated with $CO_2$ removal so that no separate oxygen source 103 is needed. While the flow diagram in FIG. 1A shows $O_2$ replenishment occurring before removal of $CO_2$, these functions may be transposed in the SCBA 101. Furthermore, the reality of execution of the SCBA 101 may require additional functions, including accommodations for the mechanics of human breathing, accommodations for the heat generated by the $CO_2$ removal process, and accommodations for the water generated by the $CO_2$ removal process.

Figure 1B:
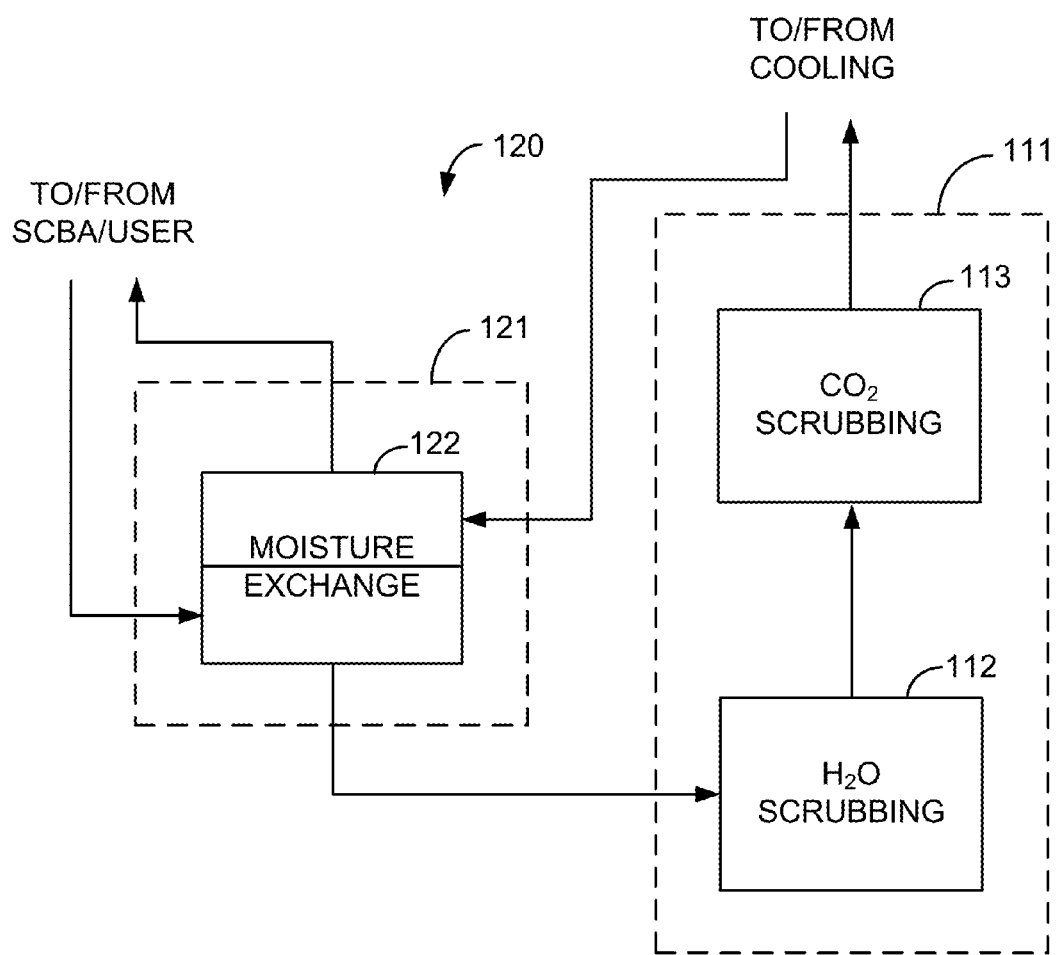
FIG. 1B shows a flow diagram illustrating an example regenerable, heat-abating, humidity-neutralizing, carbon dioxide removal system for an SCBA.

A regenerable, heat-abating, humidity-neutralizing, carbon dioxide removal system of an SCBA may alleviate some of the issues related to humidity and heat in returning conditioned breathing air to a user. FIG. 1B shows a flow diagram illustrating an example regenerable, heat-abating, humidity-neutralizing, carbon dioxide removal system for an SCBA. The system may be part of or may interact with an SCBA. As shown in FIG. 1B, a regenerable, heat-abating, humidity-neutralizing, carbon dioxide removal system 120 includes a humidity removal unit 121 and a chemical sorbent system 111. A user's exhalant is usually saturated with water vapor from the lungs. The user's exhalant can pass through one side of a moisture exchanger 122 of a humidity removal unit 121. The dried exhalant can then pass through a chemical sorbent system 111 that can include a water scrubber 112 for further removing water vapor and carbon dioxide scrubber 113 for removing $CO_2$ from the dried exhalant. Because the carbon dioxide scrubber 113 may be water-sensitive, removal of remaining moisture in the user's exhalant may occur prior to removal of $CO_2$. Both the process of water vapor and carbon dioxide scrubbing may generate heat as a byproduct of the scrubbing.

This heat generation is subsequently counteracted or cooled. For example, the heat generation may be cooled by a heat exchanger and/or ice pack (not shown). The flow of breathing air is routed through the other side of the moisture exchanger 122, where the moisture differential between the flows on either side of the moisture exchanger 122 drives the transport of some moisture back into the flow of the breathing air. The flow of the breathing may be slightly moist when returning to the user.

A $CO_2$ scrubbing media, such as a zeolite $CO_2$ scrubbing media, may provide a regenerable solution for an SCBA. The zeolite $CO_2$ scrubbing media may be implemented in the carbon dioxide removal unit 113 in FIG. 1B. A zeolite $CO_2$ scrubbing media may have a high capacity for $CO_2$ adsorption and have a low cost. However, a zeolite $CO_2$ scrubbing media may have a high affinity for water vapor that can reduce the capacity of $CO_2$ adsorption by the zeolite $CO_2$ scrubbing media. Moreover, a zeolite $CO_2$ scrubbing media may not be desirable for solutions that seek to reduce logistics burdens, eliminate water/ice packs used for cooling, and save on mass. In such instances where a zeolite $CO_2$ scrubbing media is not used, the $CO_2$ scrubbing media may or may not be water-sensitive, and the $CO_2$ scrubbing media may or may not be regenerable. However, it could reduce the heat generated, which could ultimately lead to a solution that does not require water/ice packs for cooling.

The carbon dioxide removal unit can include any suitable chemical sorbent for adsorbing $CO_2$ in a user's respiration. A common chemical sorbent for scrubbing $CO_2$ is soda lime or various compositions of calcium hydroxide, sodium hydroxide, and/or other combinations of alkali earth components. Examples may include but are not limited to $Ca(OH)_2$ and NaOH. In some implementations, the chemical sorbent can include but is not limited to amine-functionalized materials, metal organic frameworks (MOFs), zeolites, and an anionic exchange resin. Examples of amine-functionalized materials for chemical sorbents include carbon nanotubes, polyethylenimines (PEIs), and hyper-branched aminosilicas. MOFs are microporous, crystalline three-dimensional structures that include transition metal vertices attached three-dimensionally to other metal vertices by organic ligands and bridges. Zeolites may include zeolite molecular sieves that belong to a class of aluminosilicates consisting of tetrahedras of $AlO_4$ and $SiO_4$. An anionic exchange resin may include an anionic exchange resin sorbent that binds $CO_2$ when dry and releases $CO_2$ when wet, where small resin particles may be embedded in an inert polypropylene sheet.

Figure 2A:
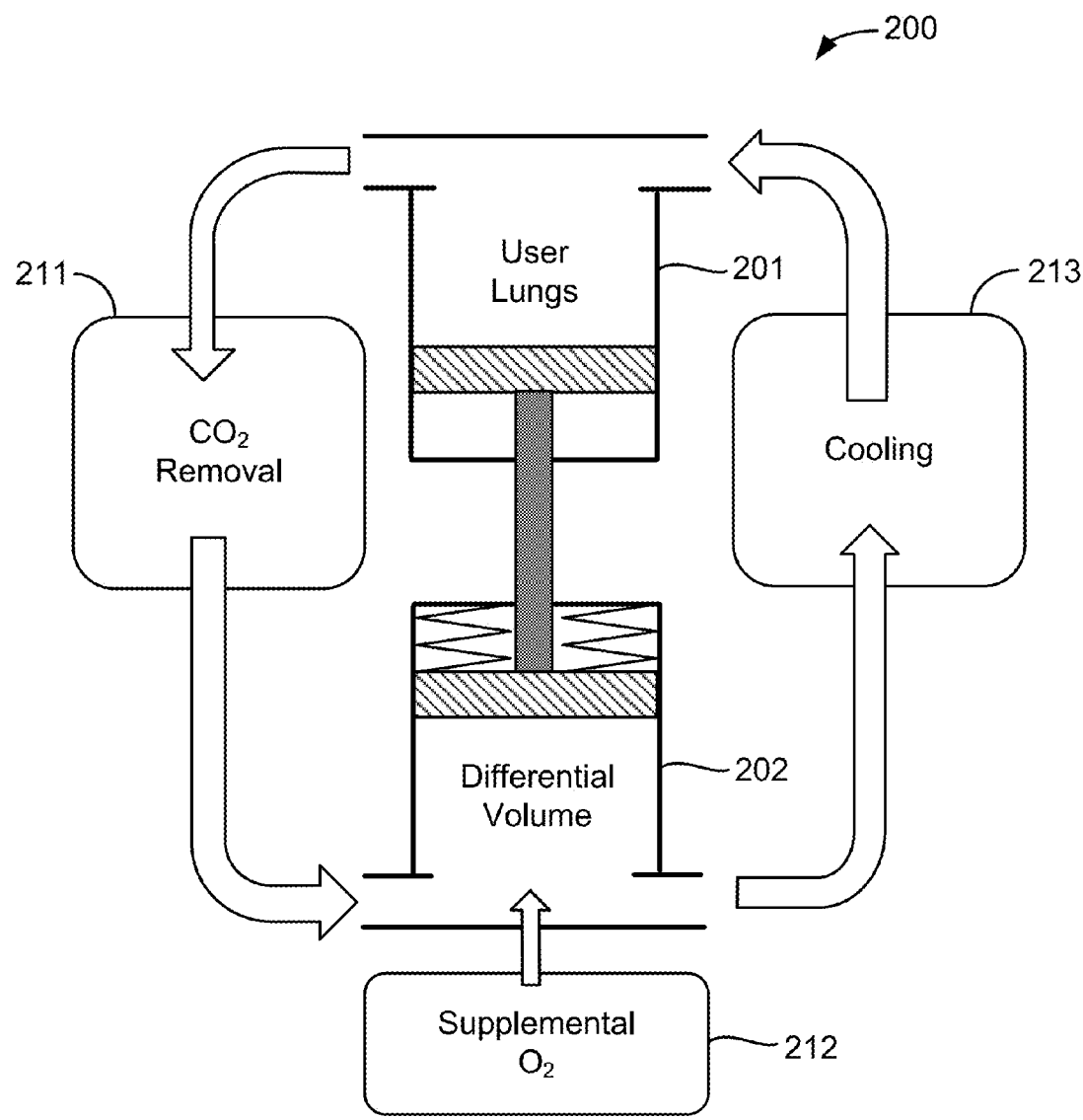
FIG. 2A shows a schematic flow diagram illustrating a flow of breathing air from a user's lungs that is reconditioned and recirculated back as inhalation air to the user's lungs.

Recirculation of breathing air back to the user may be accomplished by a differential volume. An SCBA may be powered by the motion of a "counter lung" or differential volume, which can include a breathing bag enclosed in a breathing box. The differential volume may undergo a change in volume to accommodate inhalation and exhalation by the user, thereby allowing a fixed closed total volume in a breathing loop. FIG. 2A shows a schematic flow diagram illustrating a flow of breathing air from a user's lungs that is reconditioned and recirculated back as inhalation air to the user's lungs. In an SCBA 200, air may be pushed through the SCBA 200 by the exhalation of the user's lungs 201. The exhaled air from the user's lungs 201 goes through a carbon dioxide removal unit 211, where the carbon dioxide removal unit 211 can include any suitable chemical sorbent for removing $CO_2$ from the exhaled air. The exhaled air can enter a differential volume 202 that is capable of being pressurized by entry of the exhaled air. In other words, the differential volume 202 is capable of changing volume to accommodate inhalation and exhalation by the user's lungs 201. In some implementations, the differential volume 202 is a breathing bag enclosed in a breathing box. An oxygen source 212 may replenish the exhaled air with $O_2$ at the differential volume 202 or subsequent to the differential volume 202. Replenished or reconditioned air may be pushed by the differential volume 202 through a cooling element 213, where the cooling element 213 may be a heat exchange and energy storage unit. The cooling element 213 may cool the replenished or reconditioned air to recirculate cool inhalation air for the user's lungs 201.

The user's lungs 201 and the differential volume 202 in the SCBA 200 may be considered coupled. As shown in FIG. 2A, the user's lungs and the differential volume 202 may be represented as a dual piston. Assuming that the total volume of air in the SCBA 200 is fixed, with $O_2$ being added and $CO_2$ being extracted in the process, the differential volume 202 expands or contracts accordingly to maintain conservation of total volume in the SCBA 200. For example, when the user inhales and the user's lungs 201 increase in volume, the differential volume 202 decreases in volume to push air out. When the user exhales and the user's lungs 201 decrease in volume, the differential volume 202 increases in volume to receive air in.

The differential volume 202 in the SCBA 200 is pressurized by user exhalation. This allows a positive pressure to be maintained where the user breathes recirculated air, such as in a user's facemask (not shown) in the SCBA 200. The positive pressure is affected by the placement of the differential volume 202 with respect to other components of the SCBA 200. For example, if the differential volume is positioned prior to other components of the SCBA 200, there may be a more significant pressure drop between the differential volume 202 and the facemask of the SCBA 200 as the recirculated air returns to the user's lungs 201 for inhalation.

The amount of positive pressure at the facemask may affect the effort required by the user to push air through the system of the SCBA 200. Seeing that the user exerts effort to expand their lungs 201 during inhalation, the differential volume 202 may be positioned within the system of the SCBA 200 to ensure minimal effort during inhalation. For example, the differential volume 201 may be positioned prior to various components, such as a $CO_2$ sorbent media and/or a cooling media, and thereby provide a more significant pressure drop between the differential volume 202 and the facemask to make inhalation easier. As shown in FIG. 2A, the differential volume 202 is positioned downstream from the carbon dioxide removal unit 211 but upstream from the cooling element 213.

Figures 2B, 2C:
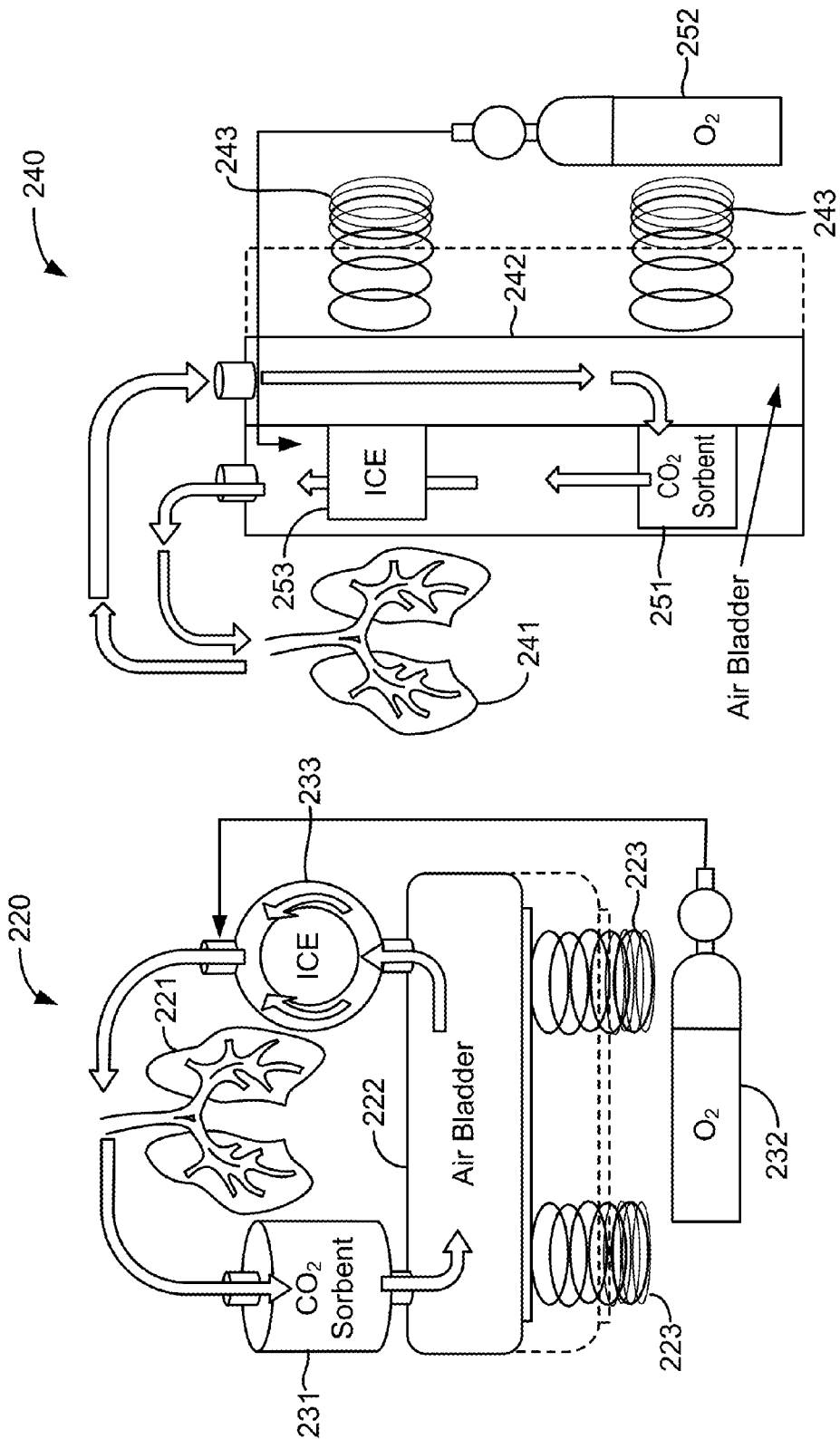
FIG. 2B shows a schematic diagram of an example SCBA with a carbon dioxide removal unit, a differential volume, and a phase change material (PCM) heat exchange and energy storage unit, with arrows indicating the flow of breathing air according to some implementations.
FIG. 2C shows a schematic diagram of another example SCBA with a carbon dioxide removal unit, a differential volume, and a phase change material (PCM) heat exchange and energy storage unit, with arrows indicating the flow of breathing air according to some other implementations.

Various SCBA systems may take advantage of a "counter lung" or differential volume to push air through the SCBA system. FIG. 2B shows a schematic diagram of an example SCBA with a carbon dioxide removal unit, a differential volume, and a PCM heat exchange and energy storage unit, with arrows indicating the flow of breathing air according to some implementations. FIG. 2C shows a schematic diagram of another example SCBA with a carbon dioxide removal unit, a differential volume, and a PCM heat exchange and energy storage unit, with arrows indicating the flow of breathing air according to some other implementations.

In FIG. 2B showing an SCBA 220, exhaled air from a user 221 initially flows through a carbon dioxide removal unit 231. The $CO_2$ of the exhaled air is adsorbed by a chemical sorbent. The air is heated as a result of one or more exothermic reactions. In some implementations, water may be produced as a result of the chemical reaction with the chemical sorbent. The heated and humidified air then flows through an air bladder or bag 222, which can serve as a differential volume. In some implementations, the air bladder 222 can be pressurized by one or more springs 223. The one or more springs 223 may drive the positive pressure in a user's facemask (not shown) during inhalation. The heated and humidified air then flows through a PCM heat exchange and energy storage unit 233, such as an expendable ice pack, to cool the heated and humidified air. Supplemental $O_2$ from an oxygen source 232 may replenish the cooled and humidified air coming out of the PCM heat exchange and energy storage unit 233. The replenished, cooled, and humidified air may be inhaled by the user 221. As shown in FIG. 2B, the air bladder 222 is positioned downstream from the carbon dioxide removal unit 231 and upstream from the PCM heat exchange and energy storage unit 233.

In FIG. 2C showing an SCBA 240, exhaled air from a user 241 initially flows through an air bladder or bag 242, where the air bladder 242 serves as a differential volume that is capable of being pressurized by one or more springs 243. The one or more springs 243 may drive the positive pressure in a user's facemask (not shown) during inhalation. The exhaled air then passes through a carbon dioxide removal unit 251, where $CO_2$ of the exhaled air is adsorbed by a chemical sorbent. The air is heated as a result of one or more exothermic reactions. In some implementations, water may be produced as a result of the chemical reaction with the chemical sorbent. The heated and humidified air then flows through a PCM heat exchange and energy storage unit 253, such as an expendable ice pack, to cool the heated and humidified air. Supplemental $O_2$ coming from an oxygen source 252 may replenish the cooled and humidified air coming out of the PCM heat exchange and energy storage unit 253. The replenished, cooled, and humidified air may be inhaled by the user 241. As shown in FIG. 2C, the air bladder 242 is positioned upstream from both the carbon dioxide removal unit 251 and the PCM heat exchange and energy storage unit 253.

The difference between the SCBA 240 in FIG. 2C and the SCBA 220 in FIG. 2B can be seen in the order of the cooling, the $CO_2$ removal, and the $O_2$ addition, and the placement of the differential volume. In the SCBA 240 of FIG. 2C, an enclosed chamber can include both the carbon dioxide removal unit 251 and the PCM heat exchange and energy storage unit 253. In the SCBA 220, exhaled air flows through the carbon dioxide removal unit 231 prior to entering the air bladder 222, whereas in the SCBA 240, exhaled air inflates a diaphragm chamber prior to flowing the exhaled air through the carbon dioxide removal unit 251. This difference can have an effect on the pressure swing and the flow through the system as the exhaled air and the inhaled air move through the rest of the system.

Removal of the $CO_2$ by a carbon dioxide removal unit 231/251 (e.g., chemical sorbent) may be accompanied by an exothermic reaction or multistep exothermic reaction that produces heat. In some instances, removal of the $CO_2$ by the chemical sorbent may also produce water. Thus, water ($H_2O$) and heat can be byproducts of the $CO_2$ absorption reaction. An example can be seen in the reaction with a soda lime scrubbing media:

$$CO_2 + H_2O \rightarrow H_2CO_3$$

$$H_2CO_3 + 2NaOH \rightarrow Na_2CO_3 + 2H_2O + energy$$

$$Na_2CO_3 + Ca(OH)_2 \rightarrow CaCO_3 + 2NaOH$$

Assembling the above-referenced reactions together, the ultimate reaction can be: $CO_2 + H_2O + Ca(OH)_2 \rightarrow CaCO_3 + 2H_2O + energy$. For every one mole of $CO_2$ removed by the sorbent, one mole of $H_2O$ is produced. The air entering the SCBA may already be fully saturated from the lungs, and thus the addition of water from the $CO_2$ scrubbing process is expected to result in condensation somewhere in the SCBA. The quantity of water that condenses can be dependent upon, among other things, the temperatures throughout the SCBA. Typically, the placement of cooling elements will affect such temperatures throughout the SCBA to limit condensation.

Condensation in the SCBA may adversely affect the ability of a heat exchanger to perform bulk heat exchange between the breathing air and the environment. This limits the capacity of the heat exchanger in exchanging heat, thereby impairing the ability of the heat exchanger to return cooled breathing air to the user. Condensation in the SCBA may also add undesirable weight to the SCBA. Furthermore, condensation may saturate the breathing air and affect user comfort during inhalation. Drier air generally feels sensibly cooler than saturated air.

An SCBA of the present disclosure may facilitate dissipation of heat and humidity produced by the $CO_2$ removal process. This may happen at any point in the SCBA with the result of the breathing air being inhaled by the user being at a comfortable temperature and humidity. The SCBA of the present disclosure may also limit or otherwise prevent latent heat of condensation so that condensation does not occur in the SCBA.

A potential way of enhancing the performance of an SCBA is to increase the passive heat rejection from the SCBA. For example, when $CO_2$ is removed and heat and humidity are generated, and an exhalation volume is flowed into a differential volume (e.g., air bladder or bag), a like volume of ambient air can be drawn into the SCBA. In instances where the ambient air is cooler than the flow of the breathing air at some point, the potential exists for transferring heat to and out of the SCBA. Where the ambient air has humidity less than the breathing air, the potential exists for transferring moisture to and out of the SCBA.

An SCBA of the present disclosure can include a heat and humidity removal unit, where the heat and humidity removal unit serves as a membrane-based heat and mass exchanger with an environment outside the SCBA. In some implementations, the heat and humidity removal unit includes an ionomer or ionic fluid impregnated membrane. The ionomer or ionic fluid impregnated membrane can include Nafion®. When $CO_2$ from exhaled air is removed by a carbon dioxide removal unit, heat and water is generated as a byproduct of $CO_2$ removal. The generated heat and water is added to the exhaled air to produce warm, scrubbed, and humidified air. The warm, scrubbed, and humidified air may have at least some heat and moisture removed by the heat and humidity removal unit located downstream from the carbon dioxide removal unit, thereby returning cool, scrubbed, and dehumidified air back to the user during inhalation. The heat and humidity removal unit may draw a purge gas stream from an environment outside of the SCBA across the membrane-based heat and mass exchanger, where the purge gas stream is cooler and less humid than the warm, scrubbed, and humidified air entering the heat and humidity removal unit. The purge gas stream may remove at least some of the heat and the humidity from the warm, scrubbed, and humidified air to the environment outside of the SCBA. In some implementations, the purge gas stream may be pushed through the SCBA via an enclosed volume containing a differential volume that provides the motive force for counter flow.

Figure 3:
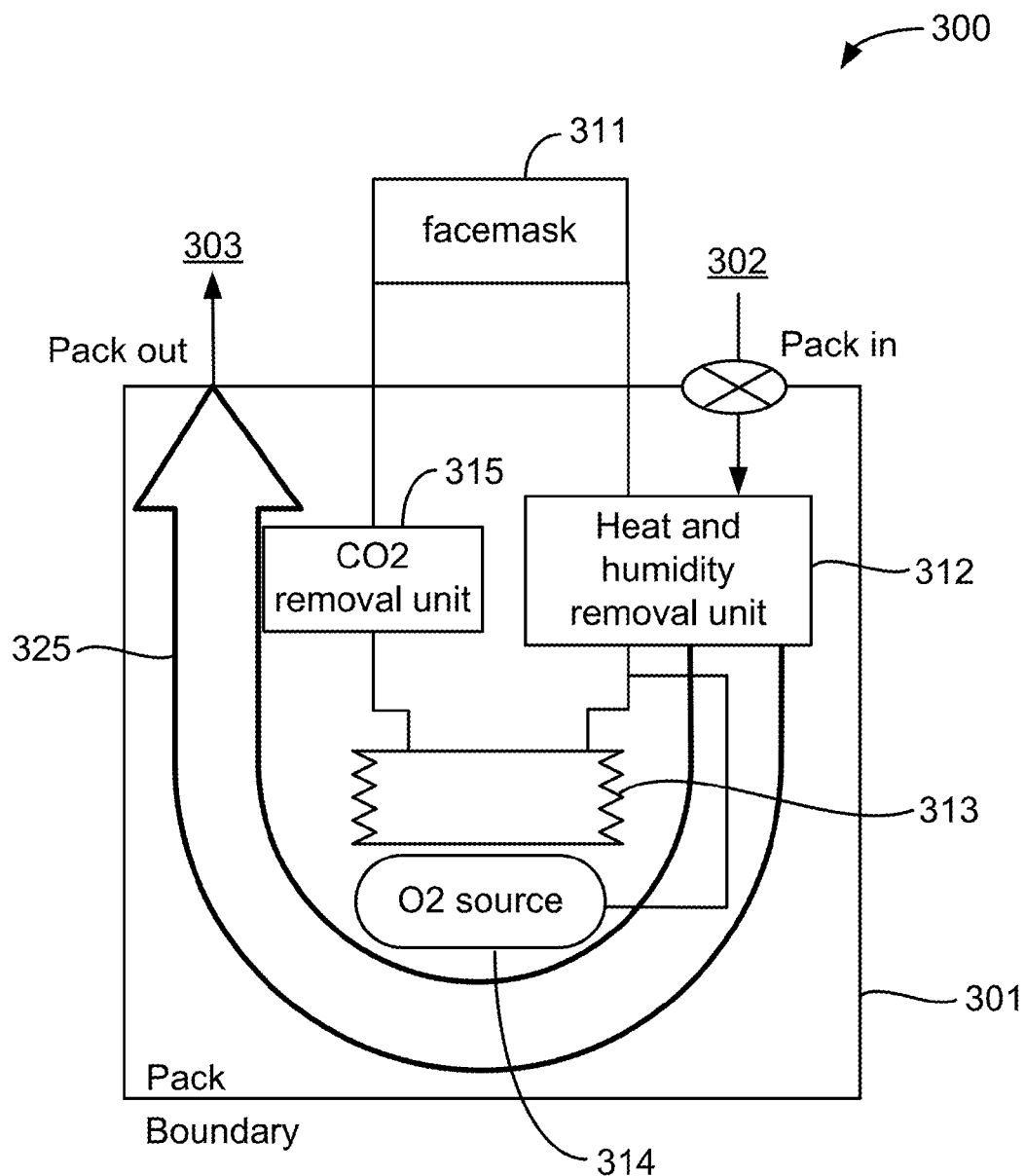
FIG. 3 shows a schematic diagram of an example SCBA with a heat and humidity removal unit with an arrow indicating the flow of a purge gas stream.

FIG. 3 shows a schematic diagram of an example SCBA with a heat and humidity removal unit with an arrow indicating the flow of a purge gas stream. An SCBA 300 includes various components, such as a carbon dioxide removal unit 315, an oxygen source 314, a differential volume 313, and a heat and humidity removal unit 312. The heat and humidity removal unit 312 may serve as a membrane-based heat and mass exchanger, where the membrane-based heat and mass exchanger includes an ionomer or ionic fluid impregnated membrane. In some implementations, the SCBA 300 further includes a user facemask 311. The heat and humidity removal unit 312 may replace a conventional heat exchange and energy storage unit in a conventional SCBA, where the conventional heat exchange and energy storage unit may be limited by its storage capacity and further hindered by condensation. Thus, the heat and humidity removal unit 312 may replace cooling systems in previous SCBA architectures.

The heat and humidity removal unit 312 of the SCBA 300 may passively reject heat and water vapor to an external environment, where the heat and humidity removal unit 312 may remove water vapor from a breathing loop and transfer the water vapor to an environment outside of the SCBA 300. The heat and humidity removal unit 312 of the SCBA 300 may also remove heat from the breathing loop to the environment outside of the SCBA 300. The heat and humidity removal unit 312 may draw cooler gas from the environment outside of the SCBA 300. Heat and humidity is rejected from the breathing loop in FIG. 3.

To remove the heat and humidity from the breathing loop, the SCBA 300 can include a gas inlet 302 for receiving a sweep gas or purge gas stream 325. For example, the purge gas stream 325 can include ambient air from the environment outside of the SCBA 300. The purge gas stream 325 can have a temperature and humidity less than the breathing air entering the heat and humidity removal unit 312. The purge gas stream 325 may sweep across the membrane-based heat and mass exchanger to draw at least some heat and humidity out of the heat and humidity removal unit 312. The heat and humidity drawn from the purge gas stream 325 may exit the SCBA 300 via a gas outlet 303. In some implementations, the purge gas stream 325 may flow in one direction via a one-way valve or electrically-powered fan.

In FIG. 3, the heat and humidity removal unit 312 is located downstream from the differential volume 313. In some implementations, the heat and humidity removal unit 312 can replace a conventional ice pack or heat exchange and energy storage unit in the SCBA 300. The SCBA 300 may utilize passive pack flow created by the differential volume 313 inside an enclosed volume to push the purge gas stream 325 through the heat and humidity removal unit 312 and ultimately out of the gas outlet 303 to remove heat and humidity from the SCBA 300.

As illustrated in FIG. 3, exhaled air flows through the carbon dioxide removal unit 315 and to a differential volume 313. Exhaled air from the user may be moist and laden with $CO_2$, where the exhaled air flows through a sorbent bed of the carbon dioxide removal unit 315 to adsorb $CO_2$. The exhaled air is heated and saturated upon adsorption. $O_2$ can be added to the breathing loop from the oxygen source 314. In some implementations, the SCBA 300 does not include a separate oxygen source 314, but may have oxygen cogenerated with the carbon dioxide removal unit. Rather than being cooled by a cooling media such as an ice pack, the air is flowed through the heat and humidity removal unit 312 to reject heat and humidity from the breathing loop. A purge gas stream 325 can pass through a membrane-based heat and mass exchanger of the heat and humidity removal unit 312 to transfer heat and humidity out of the SCBA 300.

Figure 4A:
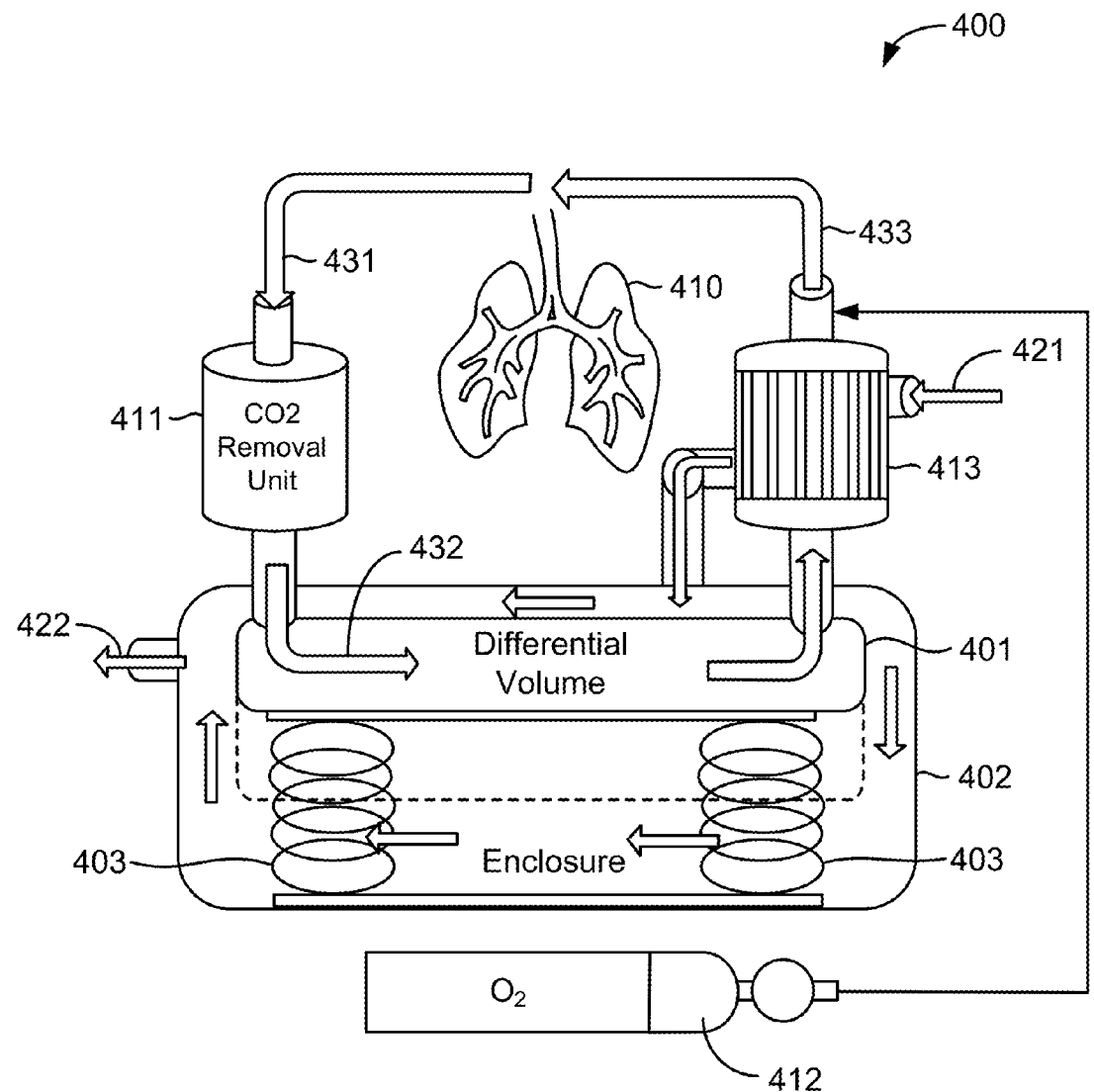
FIG. 4A shows a schematic diagram of an example SCBA with a carbon dioxide removal unit, a differential volume, and a heat and humidity removal unit with arrows indicating the flow of breathing air and a purge gas stream.

FIG. 4A shows a schematic diagram of an example SCBA with a carbon dioxide removal unit, a differential volume, and a heat and humidity removal unit with arrows indicating the flow of breathing air and a purge gas stream. An SCBA 400 includes a carbon dioxide removal unit 411, a differential volume 401 fluidly coupled to the carbon dioxide removal unit 411 and positioned downstream from the carbon dioxide removal unit 411, and a heat and humidity removal unit 413 fluidly coupled to the differential volume 401 and positioned downstream from the differential volume 401. In some implementations, the SCBA 400 further includes an oxygen source 412 configured to provide $O_2$ to breathing air of the SCBA 400. However, it will be understood that the SCBA 400 need not include a separate oxygen source 412. For example, $O_2$ may be cogenerated with the carbon dioxide removal unit 411. In some implementations, the SCBA 400 further includes a housing 402 with an enclosed volume providing a flow path for a purge gas stream to remove heat and humidity from the SCBA 400 via counter flow surface exchange, where the differential volume 401 is contained within the enclosed volume of the housing 402. Where the differential volume 401 may define a first volume to accommodate the breathing air, the housing 402 may define a second volume in the enclosed volume but outside of the differential volume 401 to accommodate the purge gas stream. In some implementations, the differential volume 401 is capable of being pressurized by breathing air coming from the carbon dioxide removal unit 411, where pressurization may at least be partially driven by one or more springs 403 connected to the differential volume 401.

The heat and humidity removal unit 413 may serve as a membrane-based heat and mass exchanger powered by the motion of a "counter lung" or differential volume 401, which is enclosed in the housing 402 (e.g., breathing box or enclosed volume). During inhalation, flow is drawn through the membrane-based heat and mass exchanger of the heat and humidity removal unit 413 and towards the user. Reduction in the volume of breathing air in the differential volume 401 induces an equal volume of counter-flow (e.g., purge gas flow) into the housing 402 from the heat and humidity removal unit 412. During exhalation, flow enters the differential volume 401 that increases the volume of the breathing air in the differential volume 401. This pushes the counter-flow (e.g., purge gas flow) out of the housing 402, thereby removing heat and humidity that was exchanged at the membrane-based heat and mass exchanger to an outside environment.

The differential volume 401 may define a first volume inside the differential volume 401. By enclosing the differential volume 401 inside the housing 402, a second volume is effectively defined inside the housing 402 but outside the differential volume 401. When a user exhales or inhales, a change in volume occurs in the first volume. The differential volume 401 accommodates such a change in volume during inhalation and exhalation. When the first volume is filled, one or more springs 403 connected to the differential volume 401 may apply pressure to the differential volume 401 to push a first air stream (e.g., breathing air) through. The volume change in the first volume leads to a volume change in the second volume. The volume change in the second volume allows a second air stream (e.g., purge gas stream) to draw the second air stream into the second volume or push the second air stream out of the second volume. Thus, displacement of the differential volume 401 can serve as: (1) a closed flow path for circulating breathing air, and (2) an open flow path from the outside environment into the housing 402 and back to the outside environment. In some implementations, the open flow path may be controlled to flow in one direction by one-way valves or an electrically-powered fan.

Accordingly, a user's lungs 410 can serve as a pump to move two air streams. The user's lungs may be coupled with the differential volume 401 such that breathing air can be pushed through a first volume of the differential volume 401, and a purge gas stream can be pushed through the second volume of the housing 402. In FIG. 4A, exhaled breathing air 431 from the user's lungs 410 can be received by the carbon dioxide removal unit 411. The carbon dioxide removal unit 411 can include any suitable chemical sorbent for scrubbing $CO_2$ from the exhaled breathing air 431. The carbon dioxide removal unit 411 may generate heat and humidity as a byproduct of scrubbing $CO_2$ to produce warm, scrubbed, and humidified breathing air 432. The warm, scrubbed, and humidified breathing air 432 may be received by the differential volume 401. During inhalation, the warm, scrubbed, and humidified breathing air 432 may be drawn from the differential volume 401 and through the heat and humidity removal unit 413. The heat and humidity removal unit 413 may be capable of removing at least some heat and humidity from the warm, scrubbed, and humidified breathing air 432 to produce cooled, scrubbed, and dehumidified breathing air 433. The cooled, scrubbed, and dehumidified breathing air 433 may be replenished with $O_2$ from the oxygen source 412 and returned to the user during inhalation.

A purge gas stream 421 may be drawn from an environment outside of the SCBA 400 and through the heat and humidity removal unit 413 during inhalation when the differential volume 401 contracts. The purge gas stream 421 may have a lower temperature and humidity than the warm, scrubbed, and humidified breathing air 432 in the heat and humidity removal unit 413, thereby creating a temperature gradient and concentration gradient. The purge gas stream 421 may transfer heat and humidity away from the heat and humidity removal unit 413 and into the second volume of the housing 402, thereby producing a heated and humidified purge gas stream 422. The heated and humidified purge gas stream 422 may be transferred out of the SCBA 400 during exhalation when the differential volume 401 expands.

The heat and humidity removal unit 413 can include an ionomer or ionic fluid impregnated membrane. In some implementations, the ionomer or ionic fluid impregnated membrane can include a sulfonated perfluorinated ionomer, such as Nafion®. However, it will be understood that the ionomer or ionic fluid impregnated membrane is not limited to Nafion®, but can include can implementations of gaseous water vapor transport membranes that substantially exclude other gases. In other words, the ionomer or ionic fluid impregnated membrane may function similarly to Nafion®. The ionomer or ionic fluid impregnated membrane serves as a chemically-selective membrane that allow compounds that bind to the sulfonic acid groups to readily permeate through the chemically-selective membrane, including water. The ionomer or ionic fluid impregnated membrane is a chemically-sensitive membrane in that it selectively passes water through the membrane based on chemical affinity. Rather than selectively removing water or other gases based on molecular size, the ionomer or ionic fluid impregnated membrane can remove water and other gases based on chemical affinity. For example, the membrane can remove water and other gases based on their chemical affinity for sulfonic acid groups.

Nafion® is a copolymer of tetrafluoroethylene and perfluro-3,6-dioxa-4-methyl-7-octene-sulfonic acid. It is an inert fluorocarbon polymer with ionic channels of sulfonic acid groups scattered throughout. Nafion® includes a bulk fluorocarbon matrix with exposed sulfonic acid groups immobilized in the bulk fluorocarbon matrix. Unlike the fluorocarbon matrix, the sulfonic acid groups do not participate in chemical reactions. As a result, the sulfonic acid groups provide several important properties to Nafion®. First, Nafion® functions as an acid catalyst due to the strongly acidic properties of the sulfonic acid group. Second, Nafion® functions as an ion exchange resin when exposed to liquid solutions. Third, Nafion® can readily absorb water, from the vapor phase or the liquid phase. Each of the sulfonic acid groups can absorb up to 13 molecules of water. The sulfonic acid groups can form ionic channels through the fluorocarbon polymer, and water can be easily transported through these channels. Thus, Nafion® can serve as a selective, semi-permeable membrane to water vapor. In some implementations, the Nafion® of the ionomer membrane can be provided as a sheet or sheets. In some implementations, the Nafion® of the ionomer membrane can be provided as tubes that can form Nafion® tube walls. Nafion® tubes may be commercially available through Perma Pure LLC of Toms River, N.J.

The ionomer or ionic fluid impregnated membrane of the heat and humidity removal unit 413 may take on a variety of geometries. In some implementations, the membrane is a tube-and-shell geometry. In some implementations, the membrane is a spiral-wound geometry. In some implementations, the membrane is a pleated geometry. In some implementations, the membrane is a multi-layer stack geometry.

Figure 4B:
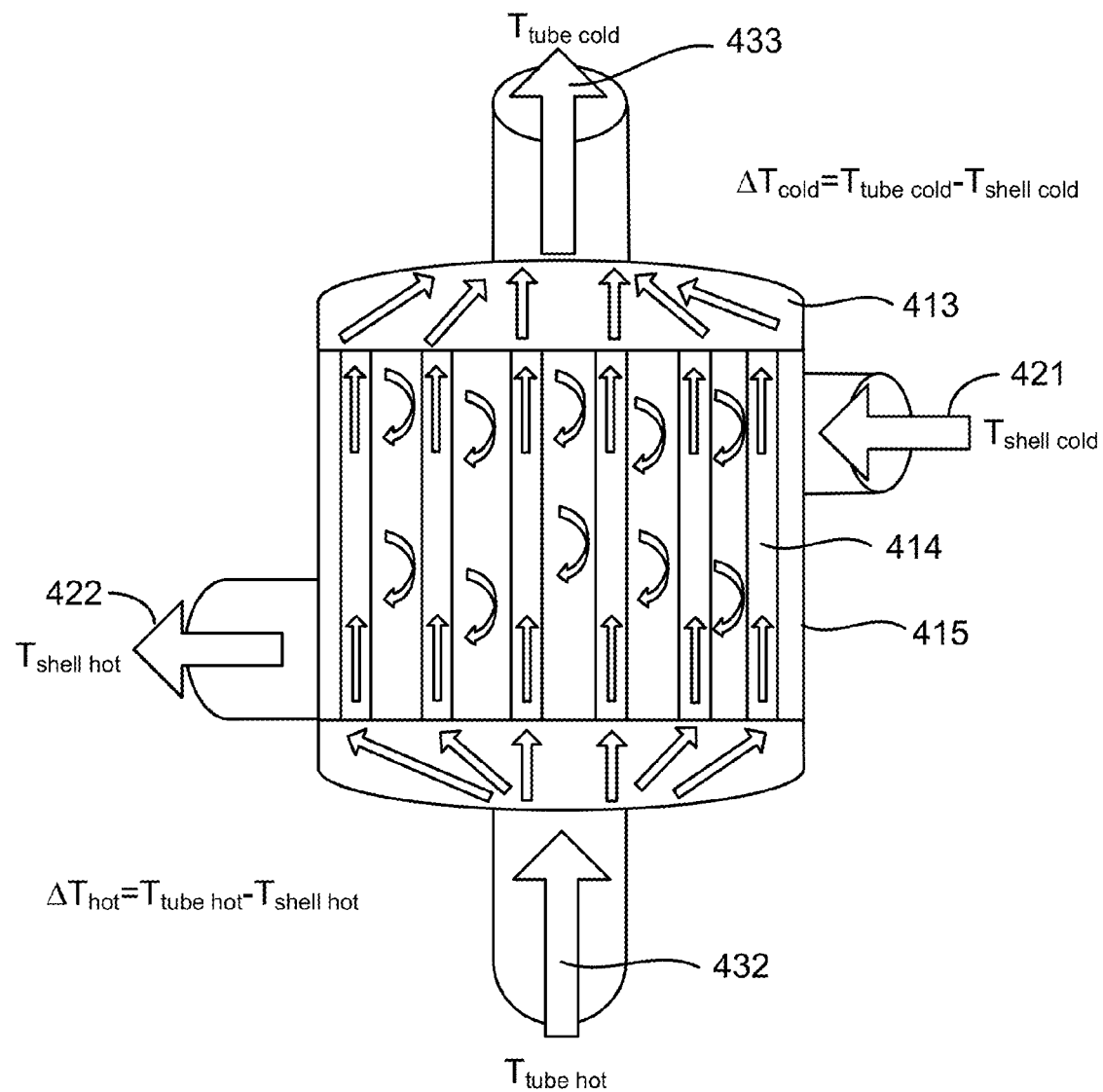
FIG. 4B shows a schematic diagram of an example heat and humidity removal unit in a tube-and-shell configuration.

FIG. 4B shows a schematic diagram of an example heat and humidity removal unit in a tube-and-shell configuration. The heat and humidity removal unit 413 can be a Nafion®-based heat and mass exchanger that includes a plurality of Nafion® tubes 414 in a shell 415. The plurality of Nafion® tubes 414 can include a series of numerous, parallel set of small diameter tubes. Rather than flowing through an expendable ice pack or other PCM heat exchange and energy storage unit, warm and humidified breathing air 432 may flow through the plurality of Nafion® tubes 414. The warm and humidified breathing air 432 may be indicated by $T_{tube\_hot}$. The water vapor in the warm and humidified breathing air 432 may be removed by the flow of a purge gas stream 421 across the Nafion® tubes 414. The flow of the purge gas stream 421 may constitute ambient air coming from an environment outside of the SCBA 400. The purge gas stream 421 may have a reduced temperature and humidity as indicated by $T_{shell\_cold}$. In some implementations, the Nafion® tubes 414 may constitute thin-walled membrane tubes to allow the transport of heat and water vapor across a gradient, such as a temperature and concentration gradient. The flow of the purge gas stream 421 may circulate around an outer surface of the Nafion® tubes 414 to facilitate transfer of heat and water vapor. A temperature and concentration gradient may facilitate the transfer of heat and water vapor from the warm and humidified breathing air 432 and across the thin-walled membrane tubes to the purge gas stream 421. Heat and water vapor may be transferred away from the heat and humidity removal unit 413 to provide a heated and humidified purge gas stream 422 with an increased temperature and humidity as indicated by $T_{shell\_hot}$. As a result of the heat and humidity removal, a cooled and dehumidified breathing gas 433 exits the heat and humidity removal unit 413 as indicated by $T_{tube\_cold}$. In some implementations, a water exchange efficiency of the heat and humidity removal unit 413 can be greater than 90%.

The length and number of Nafion® tubes 414 can be optimized to improve performance of the heat and humidity removal unit 413. A heat and humidity removal unit 413 with longer Nafion® tubes 414 may have lower overall mass than shorter Nafion® tubes 414. Shorter Nafion® tubes 414 require more tubes to increase the Nafion® surface area and thus increase water transport. However, adding more tubes increases the mass. The length of the Nafion® tubes 414 and the size of the Nafion® tubes 414 may be optimized according to the system requirements of the SCBA 400. In some implementations, where the breathing rate is about 48 standard liters per minute (SLPM), the heat and humidity removal unit 413 can include 10-inch long, 930-tube unit of Nafion® tubes 414. In some implementations, for example, a 6-inch long, 780-tube unit of Nafion® tubes 414 can be purchased off-the-shelf from Perma Pure LLC. Such an implementation can be shown to have at least 90% water removal efficiency. Utilizing Nafion® tubes in such a unit, for example, can be more efficient at removing bulk water vapor per unit mass than a zeolite in an SCBA.

The heat and humidity removal unit of the present disclosure serves as a passive in-line device where breathing air that requires conditioning is put in close proximity with purge gas that has a suitable breathing temperature and humidity. The value of such a heat and humidity removal unit, such as a heat and humidity removal unit with an ionomer or ionic fluid impregnated membrane, over a traditional heat exchange and energy storage unit is that the heat and humidity removal unit also exchanges water. This can prevent or otherwise reduce the effects of condensation in the SCBA, including the latent heat of condensation. The heat and humidity removal unit may prevent condensation in the SCBA if the mass exchange efficiency is equal to or greater than the heat exchange efficiency.

Figure 5:
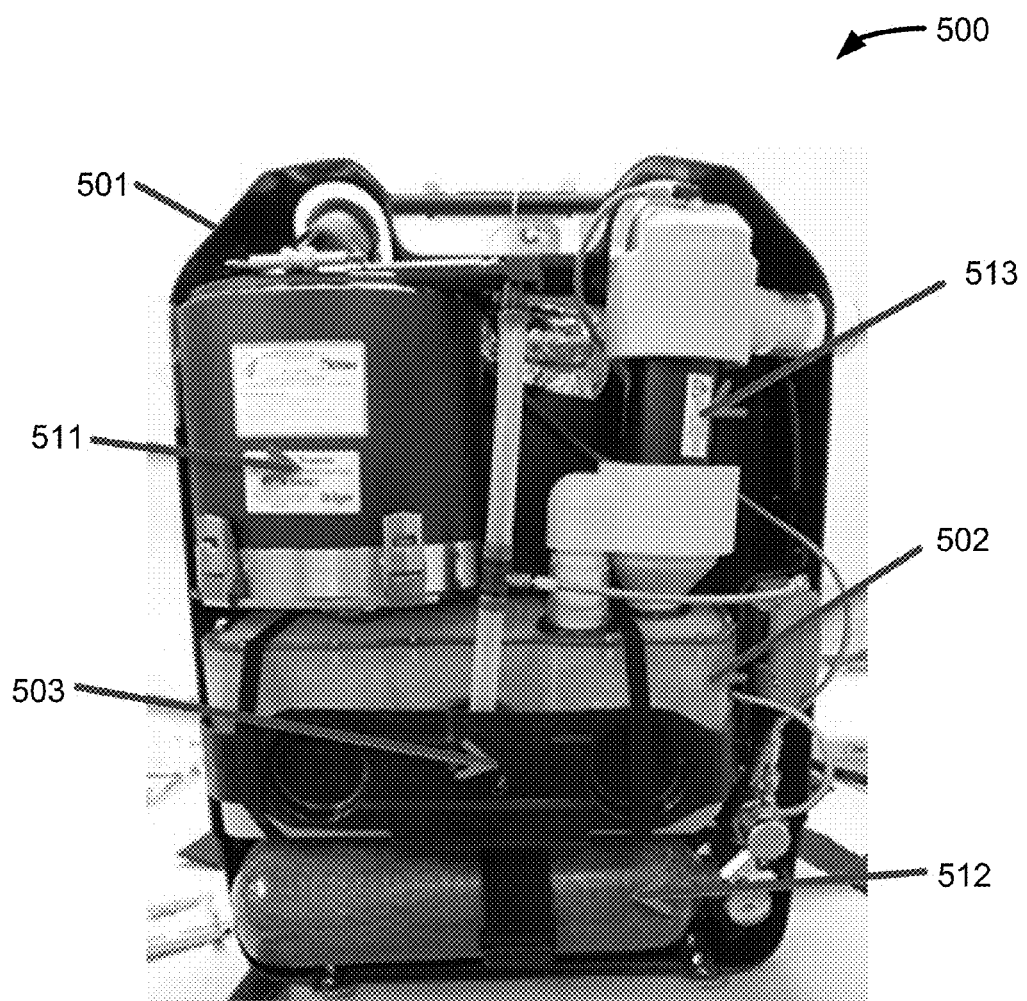
FIG. 5 shows an image of an example SCBA including a carbon dioxide removal unit, a housing including a differential volume, a heat and humidity removal unit, and an oxygen source.

FIG. 5 shows an image of an example SCBA including a carbon dioxide removal unit, a housing including a differential volume, a heat and humidity removal unit, and an oxygen source. The SCBA 500 can be integrated in a portable pack 501, where the portable pack 501 contains a carbon dioxide removal unit 511 as a sorbent canister, a housing 502 including a differential volume (not shown) connected to the carbon dioxide removal unit, and a heat and humidity removal unit 513 connected to the differential volume of the housing 502. A spring plate 503 may be connected to the housing 502 and the differential volume to pressurize the differential volume, thereby driving the flow of breathing air to the user and purge gas through the heat and humidity removal unit 513. The heat and humidity removal unit 513 can remove water vapor as well as heat associated with the water vapor by the flow of the purge gas across an ionomer or ionic fluid impregnated membrane of the heat and humidity removal unit 513. The portable pack 501 further contains an optional oxygen source 512 that is coupled to the heat and humidity removal unit 513 for supplying $O_2$ to a breathing loop of the SCBA 500. In FIG. 5, the heat and humidity removal unit 513 may replace a conventional heat exchange and energy storage unit (e.g., expendable ice pack) of a conventional SCBA. In some implementations, a differential volume (e.g., bag) of a conventional SCBA may be modified to be enclosed by the housing 502. The enclosed volume or housing 502 containing the differential volume provides the motive force for counter flow.

Figure 6:
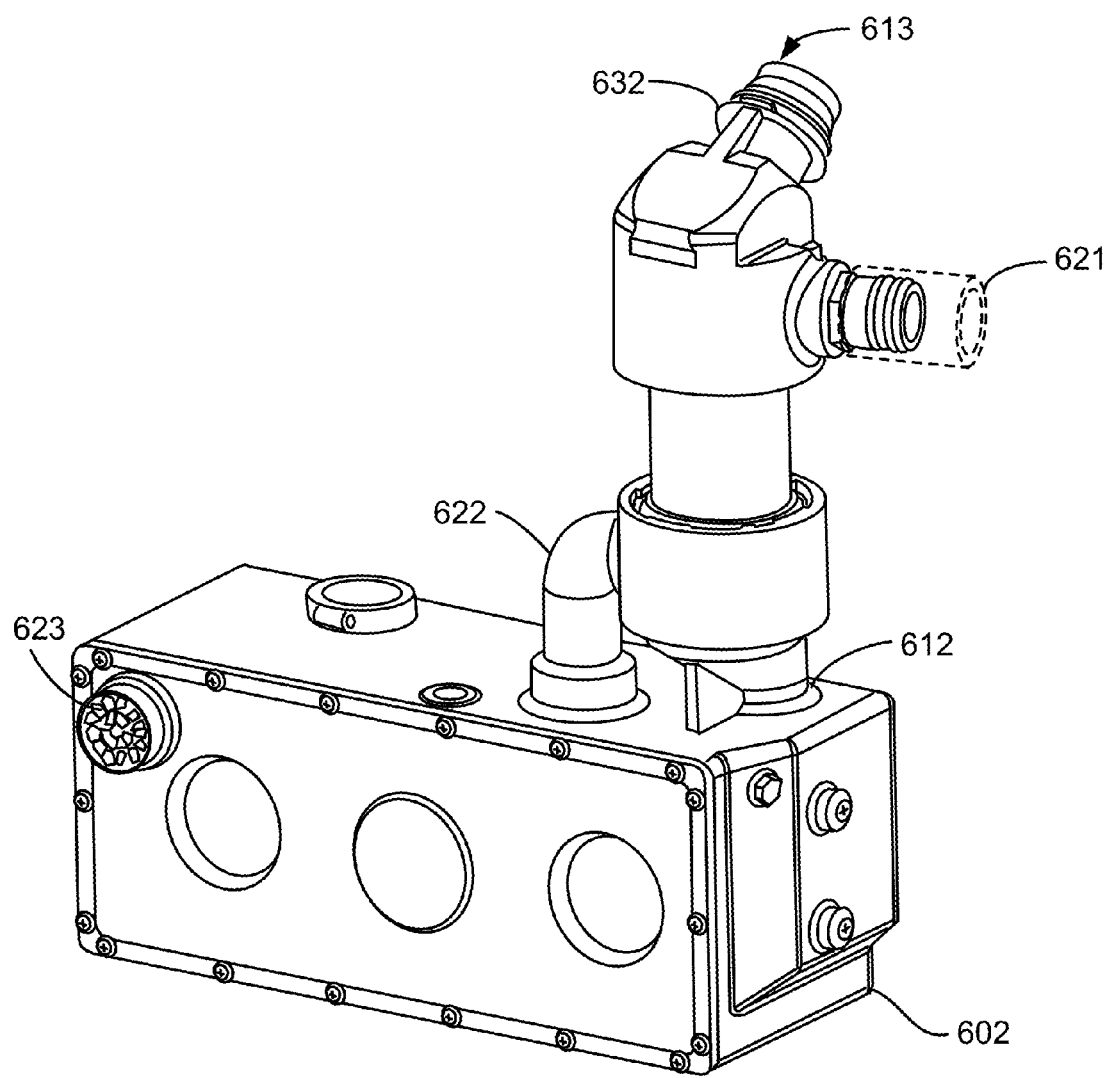
FIG. 6 shows a perspective view of an example heat and humidity removal unit connected to a housing including a differential volume.

FIG. 6 shows a perspective view of an example heat and humidity removal unit connected to a housing including a differential volume. In some implementations, the heat and humidity removal unit 613 may be referred to as a heat and mass exchanger, or specifically as membrane-based heat and mass exchanger such as a "Nafion® dryer." The heat and humidity removal unit 613 may be connected to a housing or breathing bag enclosure 602 at a first connection interface 612 and at a second connection interface 622. The first connection interface 612 connects the heat and humidity removal unit 613 to a breathing bag (not shown) for receiving breathing air. The second connection interface 622 connects the heat and humidity removal unit 613 to a volume inside the housing or breathing bag enclosure 602 but outside the breathing bag for receiving purge gas. The heat and humidity removal unit 613 may be exposed or connected to a source of the purge gas at a purge inlet 621, such as an external environment. The heat and humidity removal unit 613 may be connected to an inhaling hose (not shown) for returning breathing air to a user at a third connection interface 632.

Breathing air from a user may flow from the breathing bag and through the first connection interface 612 to the heat and humidity removal unit 613. The breathing air then flows to a membrane-based heat and mass exchanger that can include a plurality of Nafion® tubes in a Nafion® dryer. The breathing air can exit through the inhaling hose at the third connection interface 632 to return to the user. Purge gas flow may be drawn into the purge inlet 621 from an external environment. The purge gas flow may flow through the shell of the heat and humidity removal unit 613 and across the outer surface of the plurality of Nafion® tubes. The purge gas then flows into the breathing bag enclosure 602 through the second connection interface 622. The purge gas flow is subsequently rejected out into an external environment via a purge outlet 623. In some implementations, one-way umbrella check valves or other one-way valve can control the direction of the purge flow. The breathing bag is placed inside the breathing bag enclosure 602 to force displaced breathing air to flow through the shell of the heat and humidity removal unit 613 instead of the rest of the pack. This eliminates the need to implement seals at the inhalation hose and the oxygen bottle and cover interfaces. The breathing bag enclosure 602 is configured to house the breathing bag and force the displaced breathing air to flow through the heat and humidity removal unit 613 instead of through the rest of an SCBA. Breathing air flows through the Nafion® tubes and occurs during inhalation. As the breathing bag deflates during inhalation, a reduction in pressure occurs inside the breathing bag enclosure 602, causing purge gas to flow across the outer surface of the Nafion® tubes from the purge inlet 621 via a one-way valve. As the breathing bag inflates during exhalation, the remaining purge gas inside the breathing bag enclosure 602 is pushed out through an exit port via the one-way valve to the outside of the SCBA. A spring plate within the breathing bag enclosure 602 will slide back and forth using an integrated slide path.

By way of an example, an approximate weight of a heat and humidity removal unit can be about 3.25 pounds, where the enclosure can weigh about 1.32 pounds and the heat and humidity removal unit itself can weigh about 1.93 pounds. By contrast, an ice canister and ice block can weigh about 4.58 pounds. Thus, it is expected that the heat and humidity removal unit can provide a mass savings, such as a mass savings of about 1.33 pounds.

Figure 7:
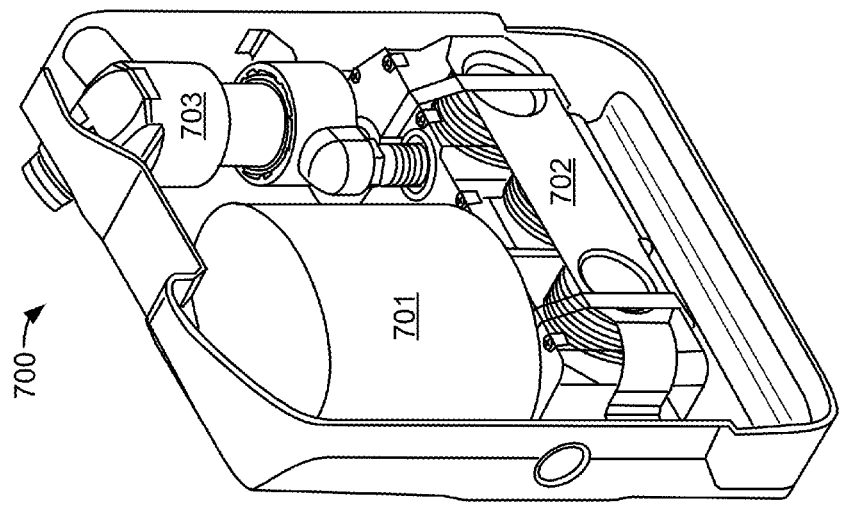
FIG. 7 shows a perspective cut-out view and a side cut-out view of an example SCBA including a carbon dioxide removal unit, a housing including a differential volume, and a heat and humidity removal unit.
Figure 7:
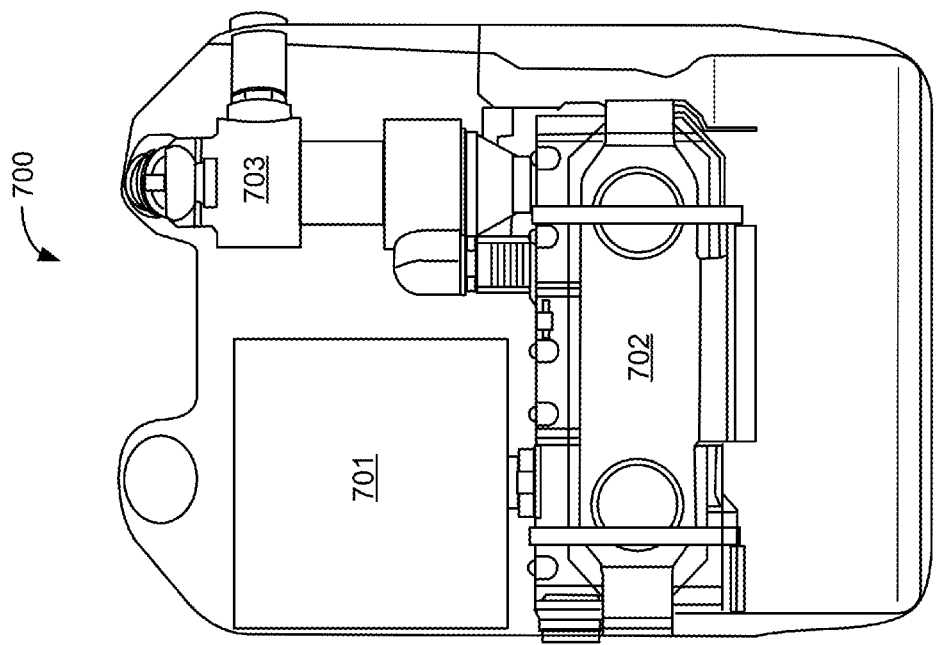

FIG. 7 shows a perspective cut-out view and a side cut-out view of an example SCBA including a carbon dioxide removal unit, a housing including a differential volume, and a heat and humidity removal unit. The SCBA 700 may include a portable pack that contains a carbon dioxide removal unit 701, a housing 702 for enclosing a differential volume (not shown), and a heat and humidity removal unit 703 that is capable of rejecting heat and humidity from the SCBA 700. The SCBA 700 may be retrofitted by providing a self-contained breathing unit or portable pack having an existing carbon dioxide removal unit 701, a differential volume, and a heat exchange and energy storage unit. The SCBA 700 may be retrofitted by then replacing the existing heat exchange and energy storage unit with the heat and humidity removal unit 703. One potential benefit is that the heat and humidity removal unit 703 can reduce the volume occupied by a previous cooling element of the SCBA 700. The heat and humidity removal unit 703 may be configured to connect and interface with the rest of the components of the SCBA 700. In some implementations, the SCBA 700 may be further retrofitted by modifying the existing differential volume and enclosing the differential volume inside the housing 702. A first volume is defined in the differential volume, where the differential volume accommodates changes in the first volume during inhalation and exhalation. A second volume is defined in the housing 702, where the housing 702 encloses the differential volume and is a constant volume enclosure. The second volume provides a flow path for purge gas to remove heat and humidity from the SCBA 700 via counter flow surface exchange when the second volume is displaced by expansion of the differential volume (counter lung).

Figure 8:
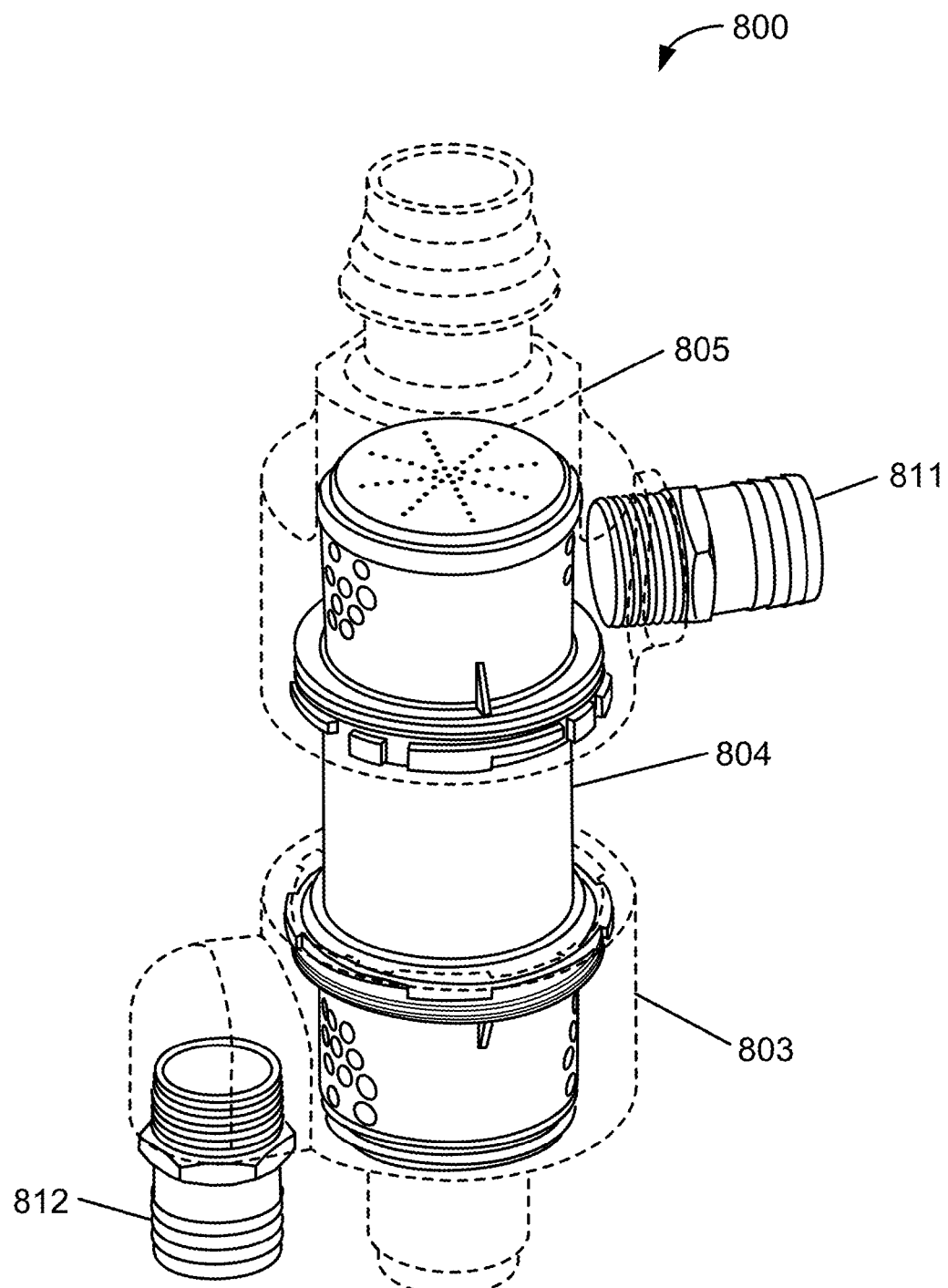
FIG. 8 shows a perspective view of an example heat and humidity removal unit.

FIG. 8 shows a perspective view of an example heat and humidity removal unit. FIG. 8 illustrates a three-dimensional illustration of the tube fittings, inlets, outlets, and other parts of a heat and humidity removal unit 800. The heat and humidity removal unit 800 can include a first tube fitting for receiving purge gas from an external environment and a second tube fitting for delivering the purge gas to a breathing bag enclosure (not shown). The heat and humidity removal unit 800 can further include an inlet end cap 803 for receiving breathing gas from a breathing bag and an outlet end cap 805 for delivering the breathing gas to a user.

Although the foregoing disclosed systems, methods, apparatuses, processes, and compositions have been described in detail within the context of specific implementations for the purpose of promoting clarity and understanding, it will be apparent to one of ordinary skill in the art that there are many alternative ways of implementing foregoing implementations which are within the spirit and scope of this disclosure. Accordingly, the implementations described herein are to be viewed as illustrative of the disclosed inventive concepts rather than restrictively, and are not to be used as an impermissible basis for unduly limiting the scope of any claims eventually directed to the subject matter of this disclosure.

What is claimed is:

1. A self-contained breathing apparatus, the apparatus comprising:
a carbon dioxide removal unit for receiving breathing air exhaled from a user, the carbon dioxide removal unit is configured to remove carbon dioxide from the breathing air and add heat and moisture to the breathing air upon removal of the carbon dioxide;
a differential volume downstream from the carbon dioxide removal unit and configured to receive the breathing air from the carbon dioxide removal unit, wherein the differential volume is configured to expand during exhalation by the user and contract during inhalation by the user; and
an ionomer or ionic fluid impregnated membrane downstream from the differential volume configured to receive the breathing air from the differential volume, and wherein the ionomer or ionic fluid impregnated membrane is configured to remove at least some of the heat and the moisture in the breathing air to provide cooler and less humidified air back to the user.

2. The apparatus of claim 1, further comprising:
an oxygen source, wherein the oxygen source is configured to provide oxygen to the breathing air to the cooler and less humidified air back to the user.

3. The apparatus of claim 1, wherein the ionomer or ionic fluid impregnated membrane is configured to receive a purge gas stream to flow across the ionomer or ionic fluid impregnated membrane.

4. The apparatus of claim 3, wherein the purge gas stream is cooler and less humidified than the breathing air received from the differential volume.

5. The apparatus of claim 3, wherein the ionomer or ionic fluid impregnated membrane includes a plurality of tubes comprising a sulfonated perfluorinated ionomer.

6. The apparatus of claim 3, wherein the ionomer or ionic fluid impregnated membrane is configured to prevent condensation in the self-contained breathing apparatus.

7. The apparatus of claim 3, wherein the purge gas stream is ambient air from an environment outside of the self-contained breathing apparatus.

8. The apparatus of claim 3, further comprising:
a housing enclosing the differential volume, wherein the housing includes an enclosed volume providing a flow path for the at least some of the heat and the moisture from the ionomer or ionic fluid impregnated membrane to be removed from the self-contained breathing apparatus.

9. The apparatus of claim 8, wherein the housing includes:
an inlet for receiving the purge gas stream with the at least some of the heat and the moisture from the ionomer or ionic fluid impregnated membrane; and
an outlet for removing the purge gas stream with the at least some of the heat and the moisture to the environment outside of the self-contained breathing apparatus.

10. The apparatus of claim 9, wherein the purge gas stream is removed through the outlet of the housing when the enclosed volume is displaced by expansion of the differential volume.

11. The apparatus of claim 1, wherein the carbon dioxide removal unit includes a carbon dioxide scrubber.

12. The apparatus of claim 1, wherein the differential volume includes a bag with one or more springs, the bag being fluidly coupled with the carbon dioxide removal unit and the ionomer or ionic fluid impregnated membrane.

13. A method of manufacturing a self-contained breathing apparatus, the method comprising:
providing a self-contained breathing unit, wherein the self-contained breathing unit includes:
a carbon dioxide removal unit for receiving breathing air exhaled from a user, the carbon dioxide removal unit being configured to remove carbon dioxide from the breathing air and add heat and moisture to the breathing air upon removal of the carbon dioxide;
a differential volume downstream from the carbon dioxide removal unit and configured to receive the breathing air from the carbon dioxide removal unit, wherein the differential volume is configured to expand during exhalation by the user and contract during inhalation by the user; and
a heat exchange and energy storage unit downstream from the differential volume and configured to receive the breathing air from the differential volume, wherein the heat exchange and energy storage unit is configured to remove at least some of the heat in the breathing air to provide cooler air back to the user;
replacing the heat exchange and energy storage unit with a heat and mass exchanger in the self-contained breathing apparatus, wherein the heat and mass exchanger is configured to receive the breathing air from the differential volume, and wherein the heat and mass exchanger is configured to remove at least some of the heat and the moisture in the breathing air to provide cooler and less humidified air back to the user; and
modifying the self-contained breathing unit to enclose the differential volume in a housing, wherein the housing includes an enclosed volume providing a flow path for the at least some of the heat and the moisture from the heat and mass exchanger to be removed from the self-contained breathing unit.

14. The method of claim 13, wherein the self-contained breathing unit further includes:
an oxygen source, wherein the oxygen source is configured to provide oxygen to the breathing air to the cooler and less humidified air back to the user.

15. The method of claim 13, wherein the heat and mass exchanger includes an ionomer or ionic fluid impregnated membrane, and wherein the heat and mass exchanger is configured to receive a purge gas stream to flow across the ionomer or ionic fluid impregnated membrane.

16. The method of claim 15, wherein the purge gas stream is cooler and less humidified than the breathing air from the differential volume.

17. The method of claim 15, wherein the ionomer membrane includes a plurality of tubes comprising a sulfonated perfluorinated ionomer.

18. The method of claim 15, wherein the heat and mass exchanger is configured to prevent condensation in the self-contained breathing apparatus.

19. The method of claim 15, wherein the housing includes:
an inlet for receiving the purge gas stream with the at least some of the heat and the moisture from the heat and mass exchanger; and
an outlet for removing the purge gas stream with the at least some of the heat and the moisture to the environment outside of the self-contained breathing unit, wherein the purge gas stream is removed through the outlet of the housing when the enclosed volume is displaced by expansion of the differential volume.

20. The method of claim 13, wherein the carbon dioxide removal unit includes a carbon dioxide scrubber.

* * * * *